(12) United States Patent
Kim et al.

(10) Patent No.: US 10,725,236 B2
(45) Date of Patent: Jul. 28, 2020

(54) LIGHT CYLINDER, DISPENSER, AND LIGHT CYLINDER MANUFACTURING METHOD

(71) Applicant: HATBIT ILLUCOM CO., LTD., Bucheon, Gyeonggi-Do (KR)

(72) Inventors: Heon Cheol Kim, Gyeonggi-Do (KR); Jang Hwan Hwang, Gyeonggi-Do (KR)

(73) Assignee: HATBIT ILLUCOM CO., LTD., Bucheon, Gyeonggi-do (KR)

(*) Notice: Subject to any disclaimer, the term of this patent is extended or adjusted under 35 U.S.C. 154(b) by 138 days.

(21) Appl. No.: 14/635,549

(22) Filed: Mar. 2, 2015

(65) Prior Publication Data

US 2016/0178838 A1 Jun. 23, 2016

(30) Foreign Application Priority Data

Dec. 23, 2014 (KR) .................. 10-2014-0187437
Dec. 23, 2014 (KR) .................. 10-2014-0187472

(51) Int. Cl.
*G02B 6/02* (2006.01)
*B29D 11/00* (2006.01)
*F21V 8/00* (2006.01)
*B05C 11/00* (2006.01)

(52) U.S. Cl.
CPC .... *G02B 6/02033* (2013.01); *B29D 11/00663* (2013.01); *B05C 11/00* (2013.01); *G02B 6/0008* (2013.01)

(58) Field of Classification Search
CPC .......... B29D 11/00663; G02B 6/02033; G02B 6/001; G02B 6/0008; G02B 6/0096; B01D 19/02; B05C 11/00; B05C 5/02; F21S 11/007; F21V 13/00; F21V 5/00
USPC ........ 362/102, 101, 202, 318, 551, 582, 171
See application file for complete search history.

(56) References Cited

U.S. PATENT DOCUMENTS

| 3,641,332 | A | * | 2/1972 | Reick ........................ A61B 1/07 264/1.24 |
| 4,045,119 | A | * | 8/1977 | Eastgate ................ G02B 6/032 385/125 |
| 4,422,719 | A | * | 12/1983 | Orcutt ............... B29D 11/00711 362/562 |
| 4,600,974 | A | * | 7/1986 | Lew .......................... F21L 4/00 362/102 |
| 4,775,590 | A | * | 10/1988 | Sakagami ........... B29C 47/0014 385/143 |
| 5,136,678 | A | * | 8/1992 | Yoshimura ............. G02B 6/122 385/132 |

(Continued)

FOREIGN PATENT DOCUMENTS

JP  05-161864 A  6/1993
JP  08-227019 A  9/1996

(Continued)

*Primary Examiner* — Arman B Fallahkhair
(74) *Attorney, Agent, or Firm* — Nelson Mullins Riley & Scarborough LLP; Kongsik Kim, Esq.

(57) ABSTRACT

A light cylinder, a dispenser, and a method of manufacturing a light cylinder are disclosed. The light cylinder includes an outer layer and an inside layer, where the inside layer is formed by filling optical resin into the inside space of the outer layer, and the refractive index of the optical resin is determined in consideration of the refractive index of the outer layer.

4 Claims, 13 Drawing Sheets

(56) References Cited

U.S. PATENT DOCUMENTS

| | | | | |
|---|---|---|---|---|
| 5,485,541 | A * | 1/1996 | Bigley, Jr. | B29C 47/8895 156/244.12 |
| 7,248,772 | B2 * | 7/2007 | Suzuki | G02B 6/10 385/129 |
| 7,369,725 | B2 * | 5/2008 | Takatori | G02B 6/001 349/62 |
| 7,433,565 | B2 * | 10/2008 | Joseph | G02B 6/001 385/109 |
| 8,057,073 | B2 * | 11/2011 | Lee | G02B 5/021 362/339 |
| 8,086,083 | B2 * | 12/2011 | Mueller | G01N 21/0303 385/125 |
| 2016/0077288 | A1 * | 3/2016 | Watte | G02B 6/3846 385/78 |

FOREIGN PATENT DOCUMENTS

| | | |
|---|---|---|
| JP | 2007-279291 A | 10/2007 |
| JP | 2008-046566 A | 2/2008 |
| JP | 5343459 B | 11/2013 |
| KR | 10-2000-0045578 A | 7/2000 |
| KR | 10-2008-0012295 A | 2/2008 |

\* cited by examiner

FIG. 9
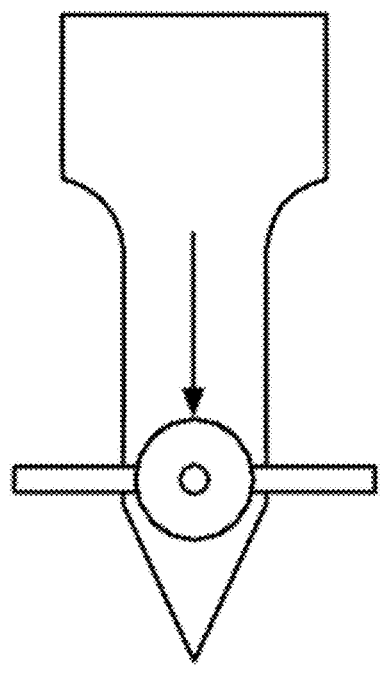
Closed State
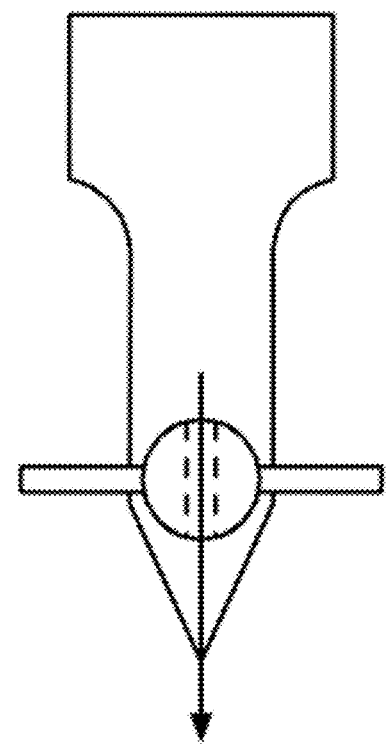
Open State

Related Art

Related Art

LIGHT CYLINDER, DISPENSER, AND LIGHT CYLINDER MANUFACTURING METHOD

CROSS-REFERENCE TO RELATED APPLICATIONS

This application claims the benefit of Korean Patent Application No. 10-2014-0187437, filed with the Korean Intellectual Property Office on Dec. 23, 2014, and Korean Patent Application No. 10-2014-0187472, filed with the Korean Intellectual Property Office on Dec. 23, 2014, the disclosures of which are incorporated herein by reference in their entirety.

BACKGROUND

1. Technical Field

The present invention relates to a flexible light cylinder that is composed of a clay filled with a UV-cured resin having high adhesive strength and low contraction, as well as to a dispenser configured to inject an optical resin for manufacturing the light cylinder and a method of manufacturing a light cylinder using the dispenser.

2. Description of the Related Art

A light pipe, which is an element that transmits light from a light source through the inside of the light pipe, has gained much interest in recent times because of its ability to transmit light to remote locations with relatively little transmission loss and its potential for allowing small thicknesses in products.

In the related art, a light pipe may include an air layer inside a clay layer, with a reflector plate installed on the inside or outside of the light pipe. Such a light pipe can transmit inputted light by internal reflection using the reflector plate.

Here, it would be desirable if the light that is outputted from a light source and inputted to the light pipe could be transferred to the output end (far end) of the light pipe uniformly, but due to the diffusion that occurs at the input end of the light pipe, the light may not be transferred uniformly over the entirety of the light pipe.

Also, there is the drawback that the degree of uniformity of the light transfer is lowered near the input end of the light pipe due to light leakage.

SUMMARY

An aspect of the invention is to provide a flexible light cylinder that is composed of a clay filled with a UV-cured resin having high adhesive strength and low contraction, as well as to a dispenser configured to inject an optical resin for manufacturing the light cylinder and a method of manufacturing a light cylinder using the dispenser. Here, the light cylinder can have flexibility.

Also, an aspect of the invention is to provide a light cylinder, a dispenser, and a light cylinder manufacturing method that can reduce the occurrence of hot spots (light leakage) at the light-entrance part to provide uniformity in all areas.

Also, an aspect of the invention is to provide a light cylinder, a dispenser, and a light cylinder manufacturing method that can effectively remove bubbles which may otherwise occur when filling in the optical resin.

One embodiment of the invention can provide a light cylinder that includes an outer layer and an inside layer, where the inside layer is formed by filling optical resin into the inside space of the outer layer, and where the refractive index of the optical resin is determined in consideration of the refractive index of the outer layer.

Another embodiment of the invention can provide a light cylinder that includes a clay, which may be composed of a substance having a first refractive index, and a core, which may be composed of an optical substance formed by combining multiple substances, where the core has a second refractive index such that a total reflection relationship is established between the core and the clay.

Still another embodiment of the invention can provide a dispenser that includes: a body configured to hold an optical resin; an injection part formed on one end of the body and configured to eject the optical resin; and a bubble discharge passage formed on at least one side of the body, where the bubble discharge passage is configured to remove bubbles generated when the optical resin is ejected.

Yet another embodiment of the invention can provide a method of manufacturing a light cylinder that includes a first process of filling an optical resin into a clay and a second process of curing the optical resin, where the refractive index of the optical resin is determined in consideration of the refractive index of the clay.

Another embodiment of the invention can provide a method of manufacturing a light cylinder that includes a first process of filling an optical resin into a clay by using a dispenser holding the optical resin and a second process of curing the optical resin, where the refractive index of the optical resin is determined in consideration of the refractive index of the clay, and where the dispenser is capable of removing bubbles generated during the filling process.

A light cylinder according to an embodiment of the invention may include a core that is formed by filling with a UV-curable resin. The light that is outputted from a light source and inputted into the light cylinder can be transferred to the output end by total reflection.

Here, the resin can be of a material selected in consideration of the refractive index of the clay of the light cylinder in order that total internal reflection is possible. Such a material can be a single substance or a mixture. In particular, in cases where the resin is made as a mixture of substances, the combination of the resin for allowing total internal reflection can be modified in various ways. That is, the range of selection for the filler resin can be broadened.

Also, in a light cylinder according to an embodiment of the invention, there is very little optical loss at the vicinity of the light-entrance part, so that there is an advantage in terms of uniformity over the entirety of the light cylinder.

Also, when manufacturing a light cylinder according to an embodiment of the invention, there is the advantage of uniformity in light transmission over the entirety of the light cylinder as the bubbles that may occur due to the filling of the UV-curable optical resin can be removed.

Additional aspects and advantages of the present invention will be set forth in part in the description which follows, and in part will be obvious from the description, or may be learned by practice of the invention.

BRIEF DESCRIPTION OF THE DRAWINGS

FIG. 9 illustrates the operation of a dispenser according to an embodiment of the invention.

DETAILED DESCRIPTION

Figure 1:
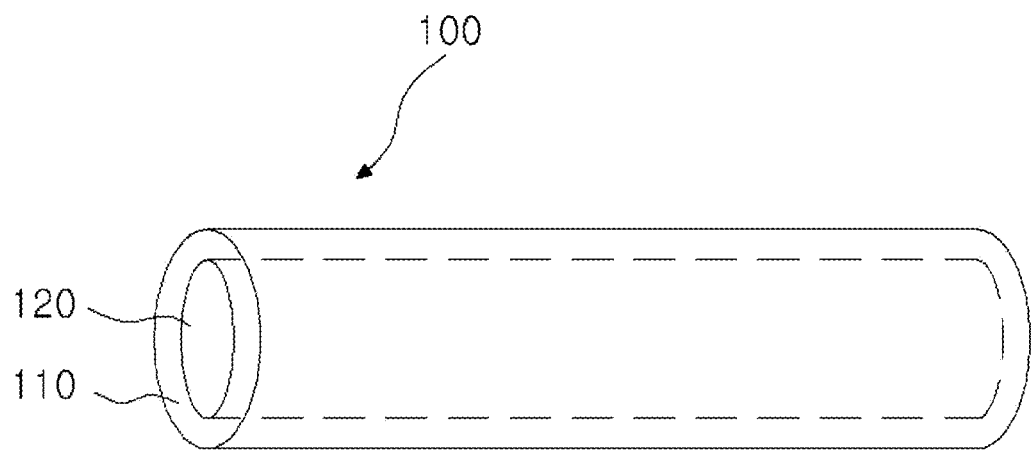
FIG. 1 is a perspective view of a light cylinder according to a first embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

In the written description, certain detailed explanations of related art are omitted when it is deemed that they may unnecessarily obscure the essence of the present invention. Also, the ordinal numbers (e.g. first, second, etc.) used in the written description are merely to distinguish one element from another.

Also, in the written description, when one element is mentioned as being "coupled" or "connected", etc., to another element, this can mean that the one element is directly coupled or directly connected with the other element, but unless there is explicit descriptions to the contrary, it can also mean that the elements are coupled or connected by way of yet another element positioned in-between.

Certain embodiments of the present invention will be described below in more detail with reference to the accompanying drawings.

Figure 2:
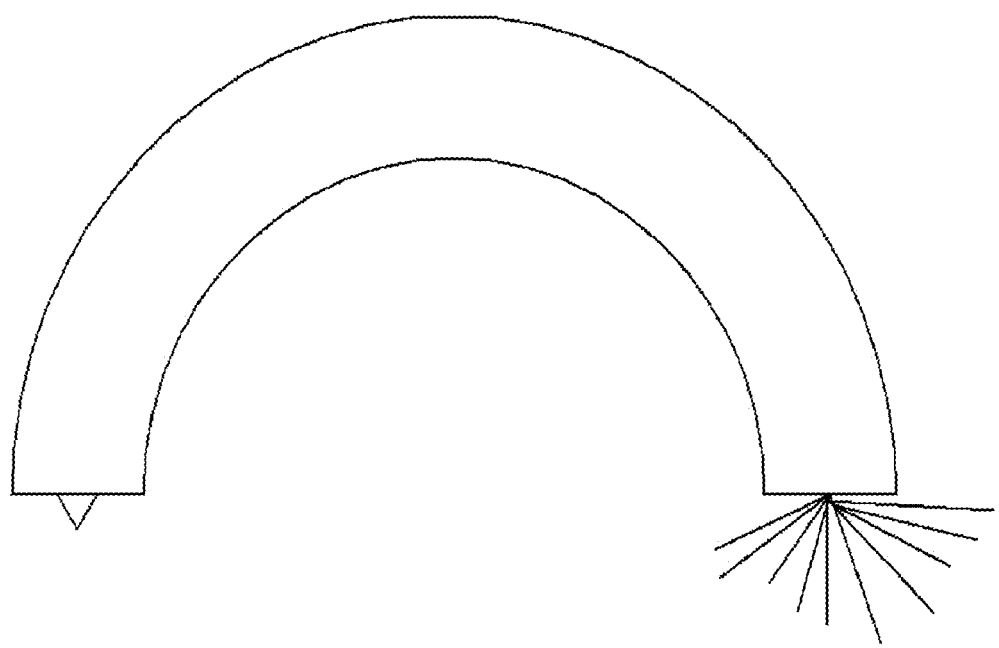
FIG. 2 is a diagram of a light cylinder according to a second embodiment of the invention.

FIG. 1 is a perspective view of a light cylinder according to a first embodiment of the invention, and FIG. 2 is a diagram of a light cylinder according to a second embodiment of the invention.

As illustrated in FIG. 1, a light cylinder 100 according to the first embodiment may be composed of a clay 110 (outer layer) and a core 120 (inside layer). The shape of the light cylinder 100 is not limited to a particular form and can be any one of a variety of shapes such as a circle, oval, ellipse, quadrilateral, triangle, etc. The shape of the light cylinder 100 can also be a curved shape.

The clay 110 may be the exterior sheath of the light cylinder 100 that allows light diffusion. The clay 110 can be formed from a flexible material that allows curving and bending. FIG. 2 shows a clay having a curved shape.

According to a first embodiment of the invention, the clay 110 can have a cylindrical shape, such as a cylinder, a tube, etc. Of course, the clay 110 can be any one of a variety of shapes other than a cylindrical shape, such as a quadrilateral shape, a triangular shape, a planar shape, etc. The clay 110 is not limited to a particular form as long as it allows light diffusion and is made of a bendable material.

The clay 110 can be molded from a transparent or an opaque material.

Also, an existing product for an exterior sheath such as a pre-fabricated tube or cylinder can be employed as is for the clay 110.

The thickness of the clay 110 according to the first embodiment is not limited to a particular value, but it can be advantageous to select the thickness of the clay 110 within the range of greater than or equal to 0.01 mm and smaller than or equal to 10 mm in order to decrease the thickness of the final product. More preferably, the clay can be made to have a thickness that is greater than or equal to 0.01 mm and smaller than 1 mm.

The thickness of the clay 110 can be determined such that the light entering the light cylinder 100 can be efficiently contained and the light cylinder 100 is able to bend. Since the clay 110 must also serve as an exterior sheath for molding the core 120, the inside of the clay 110 may include an empty space (i.e. a hole).

The clay 110 can be molded from a resin that includes as its main component a homopolymer or a copolymer such as polycarbonate (PC), poly(methyl methacrylate) (PMMA), silicone, polyethylene (PE) resin, polypropylene (PP) resin, polytetrafluoroethylene, polystyrene, polyvinyl chloride, polyurethane (PU), thermoplastic urethane elastomer (TPU), and the like. Also, the clay 110 can be fabricated by using a material having transparency.

Here, poly(methyl methacrylate) (PMMA), a polymer that includes methyl methacrylate as a component, has superb transparency and durability compared to most plastics. It has a light transmittance of 90 to 91% and is easy to apply colors to.

Polycarbonate (PC) is easy to process by molding and has excellent optical properties and strength. That is, polycarbonate can transmit an average of about 89% of visible rays.

Polypropylene, thermoplastic resin that softens when heat is applied, is a polymer of the propylene monomer and forms a helical structure. Because of its unique crystalline structure, it provides desirable properties such as high strength, thermal resistance, and chemical stability.

Polyethylene (PE) can be divided into low-density polyethylene (LDPE) and high-density polyethylene (HDPE) and provides the advantage of easy manufacture when fabricating the clay via an extrusion process.

Also, polyurethane and thermoplastic polyurethane elastomers, which are materials having 3-dimensional structures, are durable and chemically stable and can form materials having high transmittance.

The core 120 can be formed by filling a UV-curable resin into the clay 110 and curing the resin. Such a core 120 can transmit light.

According to an embodiment of the invention, the core 120 can be made from a homopolymer or copolymer of poly(methyl methacrylate) (PMMA), a homopolymer or copolymer of polycarbonate (PC), or a homopolymer or copolymer of polypropylene, or a combination thereof.

For forming the core 120 inside the clay 110, a method of manufacturing a light cylinder by way of extrusion-molding the core and clay can also be considered, instead of filling the clay 110 with a UV-curable resin. However, if the light cylinder is manufactured by extrusion molding, there is a limit to the types of materials that can be used for the core, due to the inherent properties of extrusion molding. Because of such a limit on the types of materials available for the core, it may not be possible to implement a total reflection relationship between the core and the clay, and optical losses can occur.

Therefore, in order to easily realize total reflection properties, a method of manufacturing a light cylinder according to an embodiment of the invention can manufacture the light cylinder 100 by filling the clay 110 with an optical resin which is curable by UV rays and which can implement high refraction properties. Since the UV-curable resin can be prepared by various combinations of substances to provide a desired refractive index, it is possible to fabricate an optical resin that can form total reflection according to the material used for the clay 110. According to Snell's law, the refractive index of the core 120 formed by curing the optical resin with UV rays can be higher than the refractive index of the clay 110.

For example, the refractive index of the optical resin can be designed to satisfy Equation 1 shown below.

refractive index of optical resin≥refractive index of clay+α  [Equation 1]

Here, α represents a weight and satisfies the condition $0.001 \leq \alpha \leq 0.1$.

For example, in cases where the clay 110 is made from poly(methyl methacrylate) (PMMA), which has a refractive index of 1.492, the core 120 can be fabricated by using an optical resin having a refractive index of about 1.495 to 1.58, according to Snell's law, to enhance the total internal reflection properties.

For example, in cases where the clay 110 is made from poly(methyl methacrylate) (PMMA), which has a refractive index of 1.492, the core 120 can be fabricated by using a mixture of optical resins that have refractive indexes capable of providing total reflection properties such as urethane acrylate, epoxy acrylate, etc.

Here, the optical resin having a low viscosity as needed for the filling can be fabricated by simultaneously mixing an optical material such as urethane acrylate and epoxy acrylate, etc., with monomers of N-vinylpyrrolidone, 2-ethoxy-2-ethoxy ethyl acrylate, 1,6-hexanediol diacrylate, N-isobutoxy methyl acrylate, isooctyl acrylate, propoxylated neopentyl glycol diacrylate, butyl carbamoyloxy ethyl acrylate, epoxy methacrylate, glycidyl methacrylate, isodecyl acrylate, isooctyl acrylate, polybutadiene diacrylate, polyester acrylate, 2-ethylhexyl acrylate, hydroxy propyl acrylate, phenyl glycidyl ether, 1,4-butanediol dimethacrylate, 1,4-butanediol diacrylate, cyclohexane dimethanol diacrylate, ethoxylated bisA dimethacrylate, etc.

In particular, when the light cylinder 100 has a curved shape as in FIG. 2, the optical resin filled in the clay 110 or the refractive index of the optical resin can be determined in consideration of the substance used for the clay 110 in order that there is no optical loss near the light-entrance part of the light cylinder 100.

The optical resin can be made from one substance or can be a mixed substance. In the case of a mixed substance, the substances forming the optical resin can be used in various combinations such that the refractive index of the optical resin decided above may be obtained. For example, if the refractive index of the optical resin for the filling is determined to be 1.5, the optical resin can be fabricated by mixing an optical material such as urethane acrylate and epoxy acrylate, etc., with monomers of N-vinylpyrrolidone, 2-ethoxy-2-ethoxy ethyl acrylate, 1,6-hexanediol diacrylate, N-isobutoxy methyl acrylate, isooctyl acrylate, propoxylated neopentyl glycol diacrylate, butyl carbamoyloxy ethyl acrylate, epoxy methacrylate, glycidyl methacrylate, isodecyl acrylate, isooctyl acrylate, polybutadiene diacrylate, polyester acrylate, 2-ethylhexyl acrylate, hydroxy propyl acrylate, phenyl glycidyl ether, 1,4-butanediol dimethacrylate, 1,4-butanediol diacrylate, cyclohexane dimethanol diacrylate, ethoxylated bisA dimethacrylate, etc., in appropriate proportions.

In another example, if the refractive index of the optical resin for the filling is determined to be 1.5, the core 120 can be fabricated with an acrylate having good optical properties and an acrylate having good adhesion in the main chain and with an optical resin having a high refractive index and an acrylate for adjusting the viscosity included. That is, the combination for the optical resin can be changed in various ways as long as the determined refractive index can be obtained.

Also, while the descriptions above refer to the filled resin being cured by UV rays, the filled resin is not limited to curing by UV rays as long as it can be cured after it is filled in the clay 110.

In summary, a method of manufacturing a light cylinder according to the present embodiment may entail filling the clay 110 with an optical resin having a refractive index that is determined in consideration of total reflection, and then curing the optical resin by UV curing to form the core 120. As the core 120 is formed by a filling method, various combinations can be used for the optical resin, and the core 120 can be formed with a desired refractive index by suitably combining substances according to the refractive index of the clay 110. Consequently, the light entering the light cylinder 100 can be outputted at the light-exit surface with a low loss factor. Moreover, the light leakage near the light-entrance part of the light cylinder 100 can also be considerably reduced.

Also, whereas the conventional light pipe may require a reflective pattern for transferring light, a light cylinder 100 based on the present embodiment does not require a reflective pattern, so that the light cylinder 100 can have a simpler structure and can be manufactured more easily.

While the descriptions above refer to the core 120 being composed as a single layer, it can just as well be composed of multiple layers.

Figure 3:
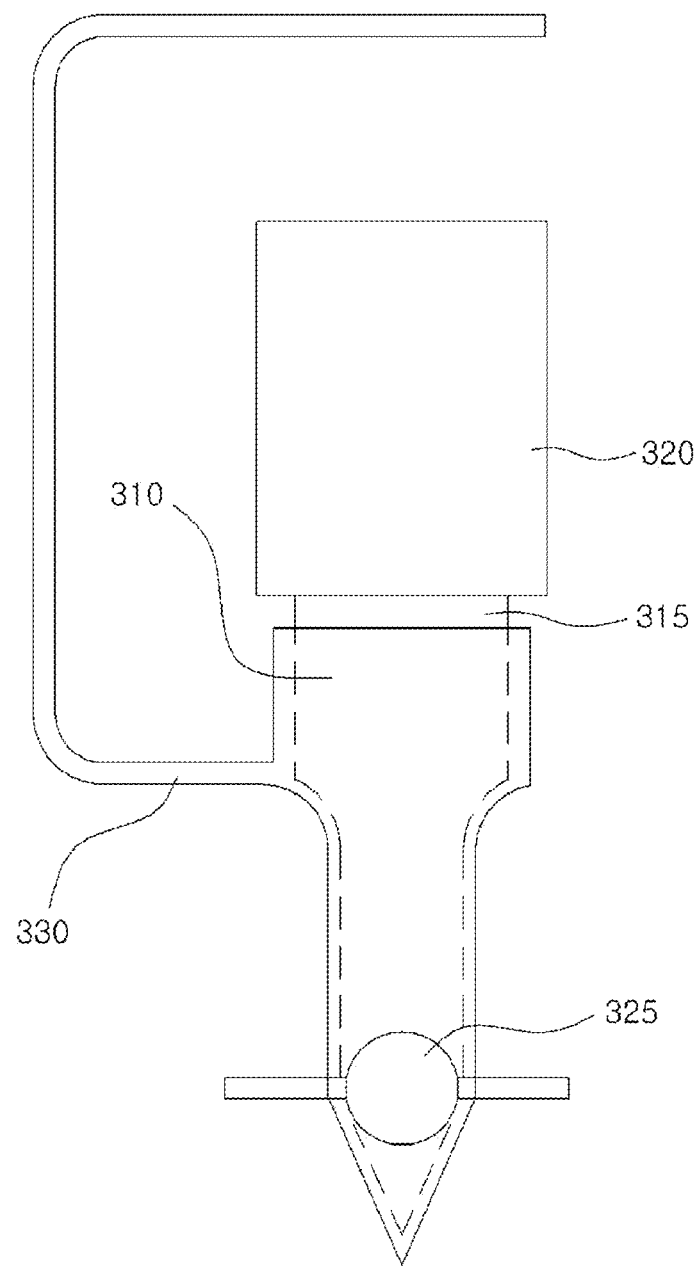
FIG. 3 illustrates the structure of a dispenser for manufacturing a light cylinder according to a first embodiment of the invention.

Such a light cylinder 100 can be formed by filling an optical resin into the inside of the clay 110 using a dispenser 300 such as that illustrated in FIG. 3. The structure of a dispenser for manufacturing the light cylinder is described below with reference to FIG. 3.

Figure 4:
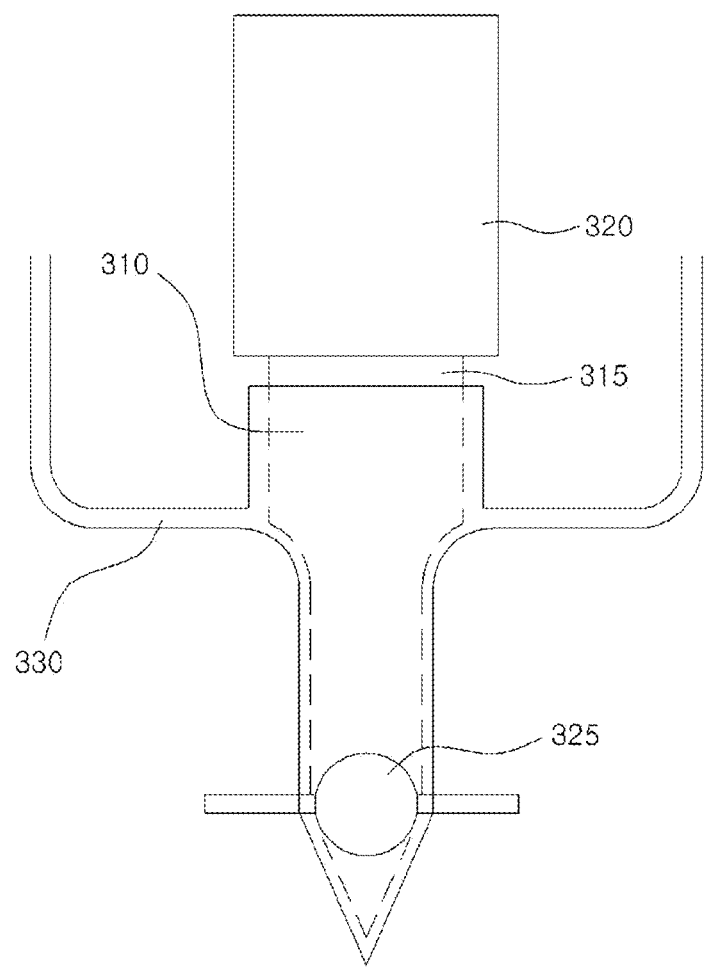
FIG. 4 illustrates the structure of a dispenser for manufacturing a light cylinder according to a second embodiment of the invention.
Figure 5:
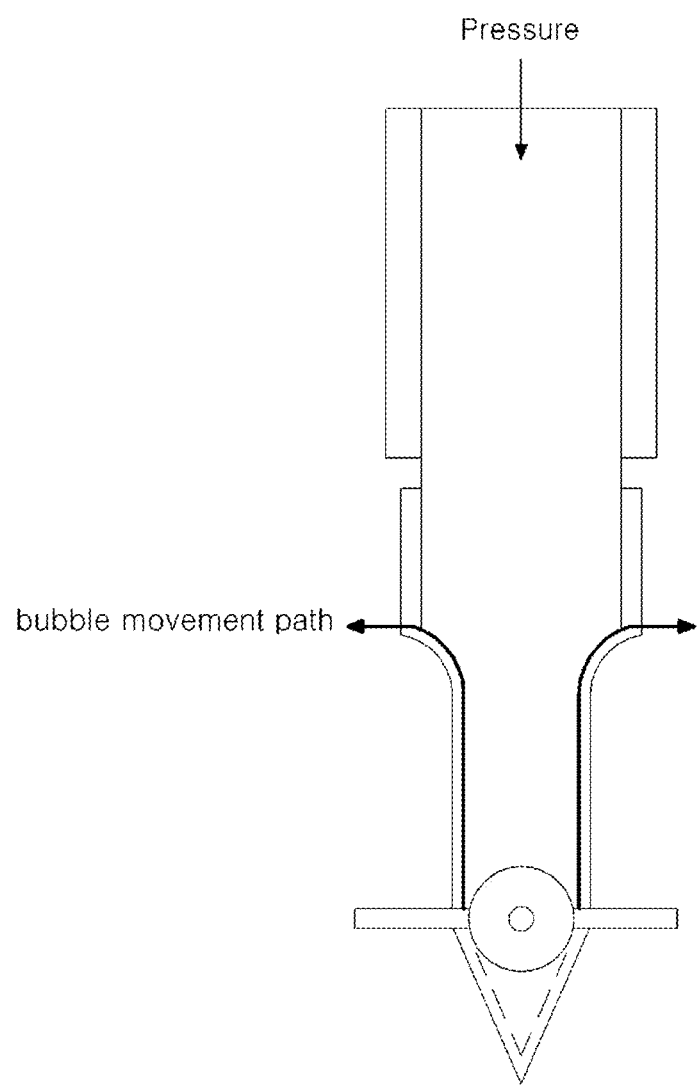
FIG. 5 illustrates the movement paths of bubbles according to a first embodiment of the invention.
Figure 6:
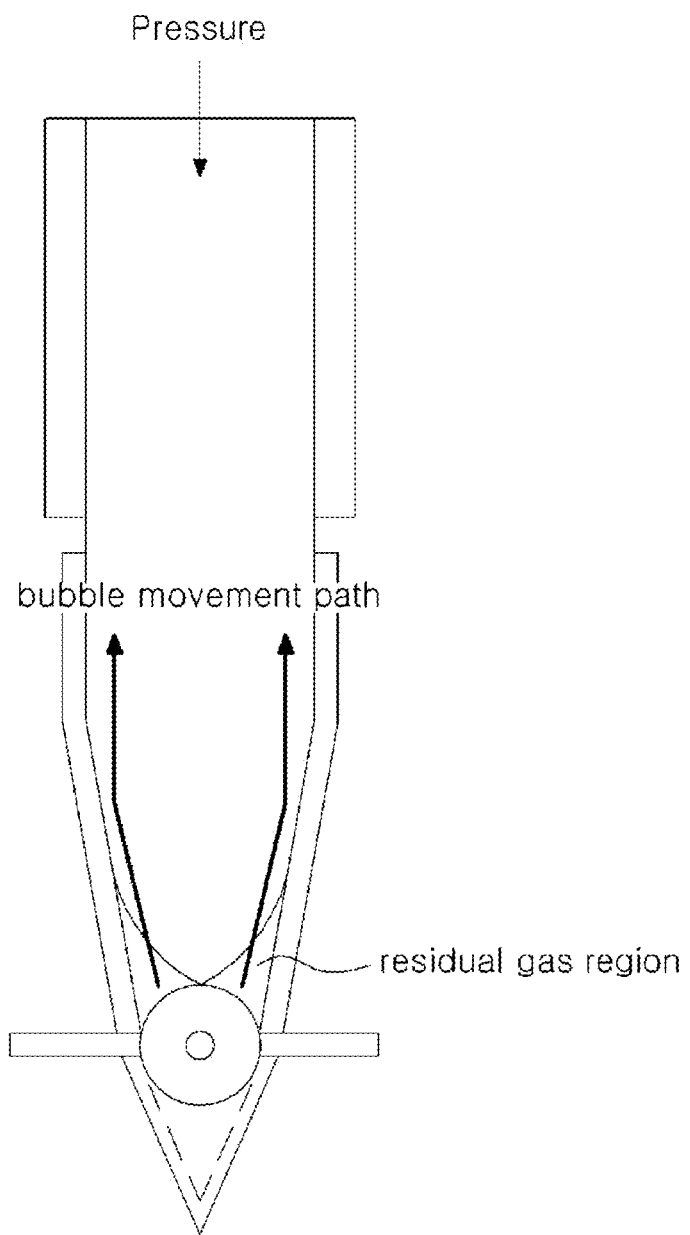
FIG. 6 and FIG. 7 illustrate the movement paths of bubbles in a conventional dispenser for comparison with the dispenser according to a first embodiment of the invention.
Figure 7:
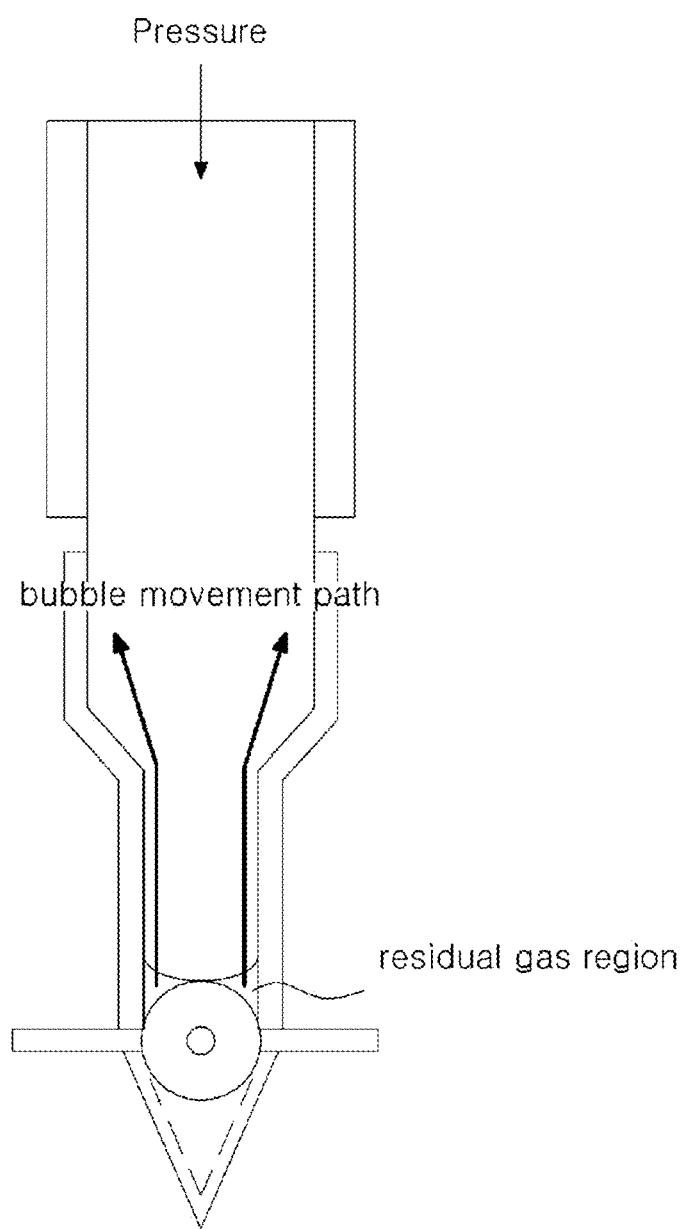
Figure 8:
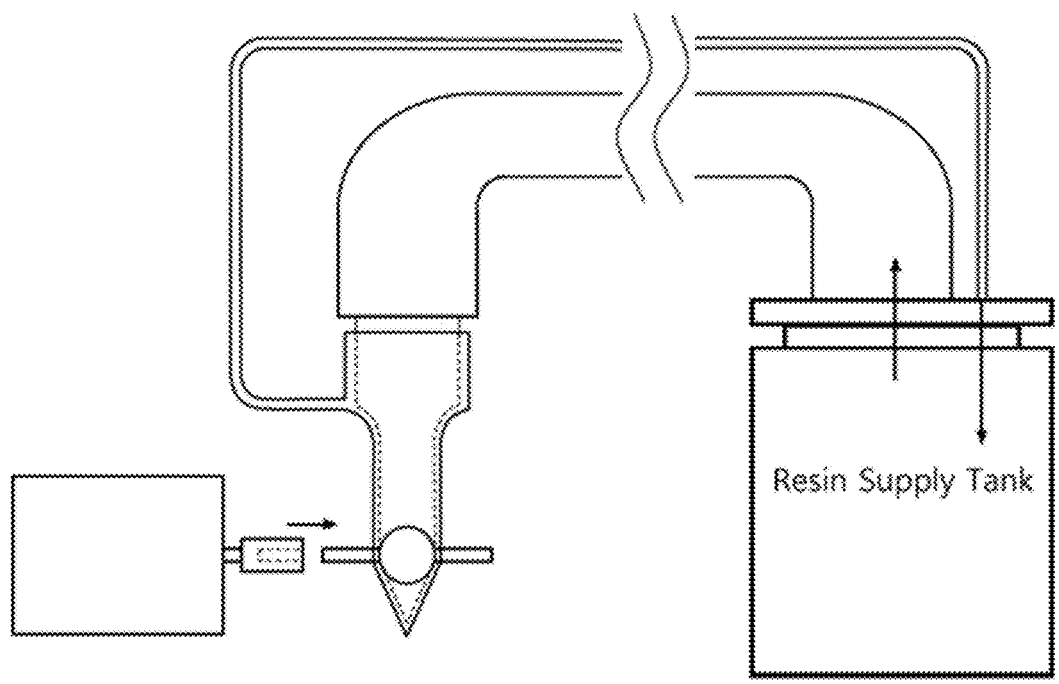
FIG. 8 illustrates a dispenser system according to a first embodiment of the invention.

FIG. 3 illustrates the structure of a dispenser for manufacturing a light cylinder according to a first embodiment of the invention, and FIG. 4 illustrates the structure of a dispenser for manufacturing a light cylinder according to a second embodiment of the invention. FIG. 5 illustrates the movement paths of bubbles according to a first embodiment of the invention, while FIG. 6 and FIG. 7 illustrate the movement paths of bubbles in a conventional dispenser for comparison with the dispenser according to a first embodiment of the invention. FIG. 8 illustrates a dispenser system according to a first embodiment of the invention, and FIG. 9 illustrates the operation of a dispenser according to an embodiment of the invention.

Referring to FIG. 3, a dispenser for filling an optical resin into the inside of a clay 110 for manufacturing a light cylinder may include a body 310, a connecting part 315, a first entry part 320, an injection part 325, and a bubble discharge passage 330.

The body 310 may be a space for holding the optical resin. The body 310 can have a first entry part 320 formed by which to be supplied with the optical resin, and can have a second entry part 325 for ejecting the optical resin formed in the other end facing the first entry part 320. For convenience, the second entry part 325 will be referred to hereinafter as the injection part.

The connecting part 315 can be positioned between the body 310 and the first entry part 320. The connecting part 315 may serve to interconnect the first entry part 320 and the body 310 of the dispenser, which are formed as tube types.

Also, on at least one side of the body 310, a bubble discharge passage 330 may be formed for removing bubbles that may occur during the ejecting of the optical resin.

When the injection part 325 is opened and the optical resin is filled into the inside of the clay 110, bubbles can occur near the injection part 325. The bubbles formed during the ejecting of the optical resin may rise upward, and when there are many bubbles rising upward, some of the bubbles may enter the inside of the clay 110 through the injection part 325 together with the optical resin. That is, bubbles may be formed inside the light cylinder. As a result, light may not be transferred adequately through the light cylinder; i.e. its optical efficiency, such as the efficiency of total reflection, may be degraded.

Thus, it may be important to remove bubbles that may occur when filling the optical resin into the clay 110 through the injection part 325.

According to an embodiment of the invention, a bubble discharge passage 330 can be formed in a portion of the body 310 such that, when the bubbles created near the injection part 325 rise upward, the bubbles can be discharged to the outside. As a result, the bubbles may not be accumulated, but rather may be discharged to the outside as soon as they are created, so that the bubbles can be prevented from entering inside the clay 110.

As illustrated in FIG. 5, the bubbles that occur when filling the inside of the clay 110 with the optical resin may rise upward while moving along the wall surface of the body 310. Accordingly, to remove the bubbles most efficiently, the body 310 may be formed with a rounded corner at the portion where the bubble discharge passage 330 is connected.

In cases where the body 310 is formed with a gentle slope in the direction of the injection part 325, as illustrated in FIG. 6, a problem may occur in that the bubbles may move along the inside of the body 310. In this case, the nozzle of the injection part 325 may have to be opened in order to completely remove the bubbles created inside the body 310.

Also, in cases where the body 310 is formed with a sudden slope in the direction of the injection part 325 followed again by a gentle slope, as illustrated in FIG. 7, a problem may occur in that the bubbles may move towards the inside of the optical resin (i.e. the inside of the body 310) at the point where the sudden slope begins.

Thus, in order to effectively remove bubbles that may be created in the optical resin supplied inside the body 310, the bubble discharge passage 330 can be formed to connect through a certain region of one side of the body 310. That is, in order to effectively remove bubbles that may be generated during the filling of the optical resin, the bubble discharge passage 330 may be formed to connect with the rounded corner region of the body 310.

Here, the bubble discharge passage 330 can have a small diameter or can be formed in an upward direction such that the optical resin may not be discharged through the bubble discharge passage 330. Such a bubble discharge passage 330 can be designed in consideration of the injection rate, etc., of the optical resin.

In another example, a prevention membrane for preventing the leakage of the optical resin can be formed at the bubble discharge passage 330. Here, the leakage-prevention membrane can be formed at a point where the bubble discharge passage 330 connects to one side of the body 310 in order to prevent the optical resin from leaking along the bubble discharge passage 330. Because of this, only the bubbles can be removed through the prevention membrane and be discharged along the bubble discharge passage 330 without the optical resin leaking.

In yet another example, the bubble discharge passage 330 can be formed in an "L" shape so as to prevent the optical resin from leaking from the body 310. That is, the end of the bubble discharge passage 330 touching the body can be formed at a low position while the other end can be formed at a high position so that only the bubbles may be discharged.

In still another example, the bubble discharge passage 330 can be formed in the shape of a handle that connects to lower region and an upper region on at least one side of the body 310.

Such a bubble discharge passage 330 can be formed at a position adjacent to the injection part 325. In this way, the bubbles formed during the ejection of the optical resin can be promptly removed.

Also, the bubble discharge passage 330 can be formed to connect to a separate tank for supplying the resin, as illustrated in FIG. 8. Thus, even when the optical resin is leaked through the bubble discharge passage 330, it can be moved back to the resin supply tank to be used again.

That is, a method of manufacturing a light cylinder based on the present embodiment can immediately remove bubbles that occur when filling in the optical resin and thus prevent the injection of bubbles inside the clay 110, by forming bubble discharge passages 330 in the body 310 of the dispenser 300, so as to achieve uniform total reflection in the light cylinder 100.

While FIG. 3 illustrates an example in which there is one bubble discharge passage 330 formed in the body 310 of the dispenser 300, there can be bubble discharge passages 330 formed on both sides of the body of the dispenser 300, as illustrated in FIG. 4.

The position where the bubble discharge passage 330 may be formed in a portion on a side of the body 310 is not limited in a particular way. However, in order to immediately remove bubbles that may be created during the filling in of the optical resin through the injection part 325, it may be advantageous to form the bubble discharge passage 330 adjacent to the injection part 325.

The injection part 325 may be a member for injecting the optical resin into the clay.

Although it is not illustrated in FIG. 3, the injection part 325 can be connected with a motor. That is, the opening and closing of the injection part 325 can be controlled according to the operation of a motor.

FIG. 9 illustrates the closed and open states of the injection part 325. As illustrated in FIG. 9, when the injection part 325 is in a closed state, the optical resin may not be filled into the clay 110. However, when the injection part 325 is open, the optical resin may be ejected and filled into the inside of the clay 110.

That is, the injection part 325 can be implemented in the form of a valve. Thus, when the injection part 325 is opened by a motor connected thereto (i.e. when the valve is open), the optical resin held inside the body 310 can be ejected through the injection part 325 and into the inside of the clay 110.

When the ejection of the optical resin is complete and the injection part 325 is closed according to the control of the motor (i.e. when the valve is closed), the optical resin held inside the body 310 may not be ejected through the injection part 325.

Also, an injection needle can be connected to the injection part 325.

By connecting an injection needle to the injection part 325, the optical resin can be ejected into the clay 110 more easily.

Figure 10:
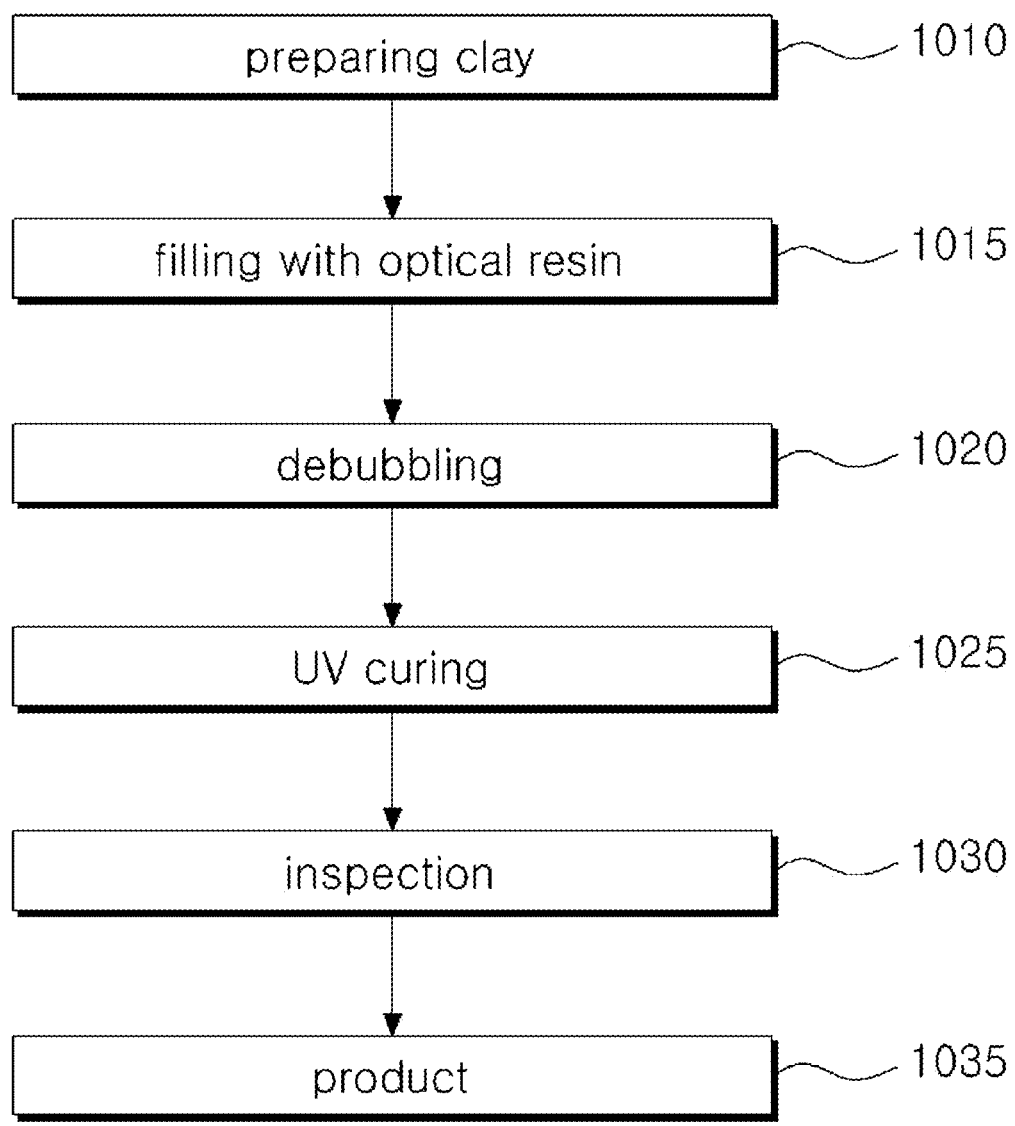
FIG. 10 illustrates a process for manufacturing a light cylinder according to a first embodiment of the invention.
Figure 11:
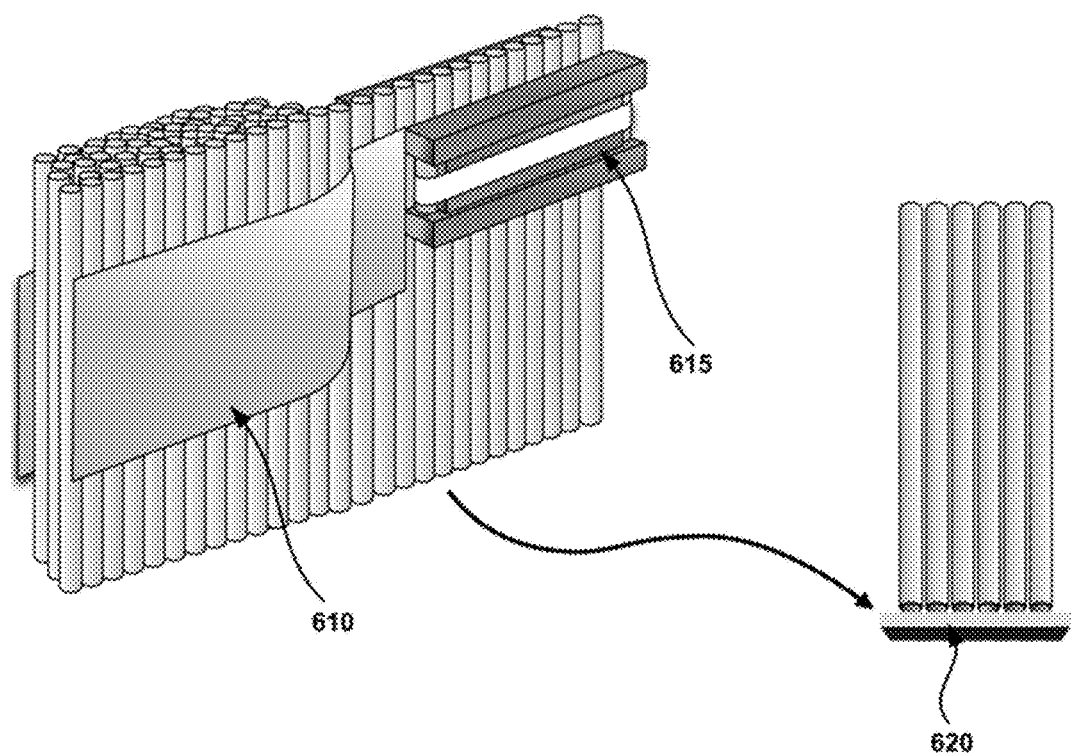
FIG. 11 illustrates a process for manufacturing a light cylinder according to a first embodiment of the invention.

FIG. 10 illustrates a process for manufacturing a light cylinder according to a first embodiment of the invention, and FIG. 11 is a diagram used for explaining a process for manufacturing a light cylinder according to a first embodiment of the invention.

In the first process 1010, clays 110 may be prepared that each have an internal hole, in the manner of a tube or a cylinder, for manufacturing a light cylinder 100 by using a filling method. Although the description herein assumes an example in which the clay 110 is shaped as a cylinder or tube for the sake of easier explanation and easier understanding, the clay 110 can take any of a variety of shapes and can be rectangular, triangular, or curved. The first process is as illustrated in 1110 of FIG. 11. According to an embodiment of the invention, the clay 110 can be an existing product.

The clays 110 prepared for manufacturing a light cylinder may be temporarily held (maintained) in a holder 1110. Then, the clays 110 may be moved in a row by a roller member 1115 for the filling of the optical resin inside the clay 110.

The roller member 1115 may be connected to one of the holder 1110, and by means of the roller member 1115, the clays 1110 held in the holder 1110 may be moved in a row.

As illustrated in FIG. 11, the clays 110 arranged and moved in a row may be filled with a UV-curable optical resin in the second process 1015. For example, suppose the clays 110 have a cylindrical or a tube-like shape. In the second process 1015, the optical resin held inside a dispenser 300 may be ejected through the injection part 325, when a piston 315 positioned in the dispenser 300 is pressed, whereby the optical resin may enter and fill the cylinder or tube.

As described above with reference to FIG. 3, the dispenser 300 can eject the optical resin into the clay 110 while immediately removing bubbles that occur with the ejection of the optical resin.

Also, in order to prevent the optical resin from flowing through the other end opposite the end where the optical resin is injected, a cap 1120 for preventing the flow of the optical resin and keeping the optical resin held within the clays 110 can be connected to the other end of the clays 110 when the clays 110 are filled with the optical resin. As already described above, the optical resin can be a UV-curable resin.

The cap 1120 can be positioned below where the roller member 1115 is positioned. That is, since the cap 1120 is formed for the purpose of preventing the optical resin that have been filled in the clays 110 from flowing out, the cap 1120 does not have to be positioned below the holder 1110. In the third process 1020, a debubbling process can be performed in which the bubbles created while filling the clays 110 with the optical resin are removed. If the bubbles are not removed and are left to infiltrate the inside of the clay 110, the optical properties of the light cylinder 100, such as the uniformity of the light transfer for example, can be degraded. Therefore, a method of manufacturing light cylinders according to the present embodiment may also remove the bubbles while filling the clays 110 with the optical resin. As a result, the uniformity of the light transfer through the core 120 can be increased.

In the fourth process 1025, the filled optical resin may be cured. Here, the curing can entail UV-curing.

The direction of irradiating the UV rays for curing the resin can be the same as the direction in which the resin is injected into the clays 110.

As described with respect to FIG. 3, when a UV-curable resin is used to manufacture a light cylinder 100, it is possible to mix several materials to form the resin, and as such, it is easy to adjust the refractive index.

In the fifth process 1030, an inspection process may be performed, to inspect the light cylinder 100 manufactured by way of UV curing. The inspection process can entail inspecting whether or not a uniform core has been formed in the light cylinder 100 by the filling of the optical resin.

In the sixth process 1035, the light cylinder 100 that has passed the inspection process may be distributed as a product.

Figure 12A:
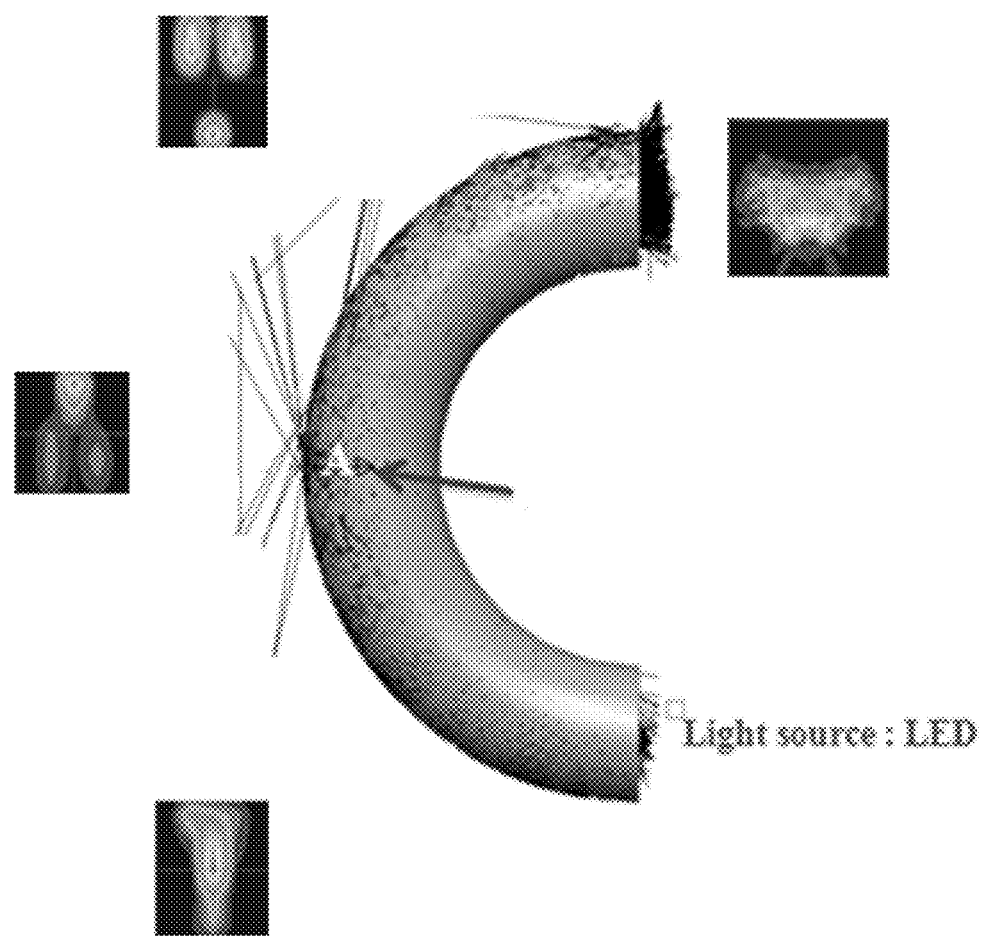
FIG. 12A and FIG. 12B show simulation results on light leakage for a light cylinder according to a first embodiment of the invention and a light cylinder manufactured by extrusion molding according to the related art.
Figure 12B:
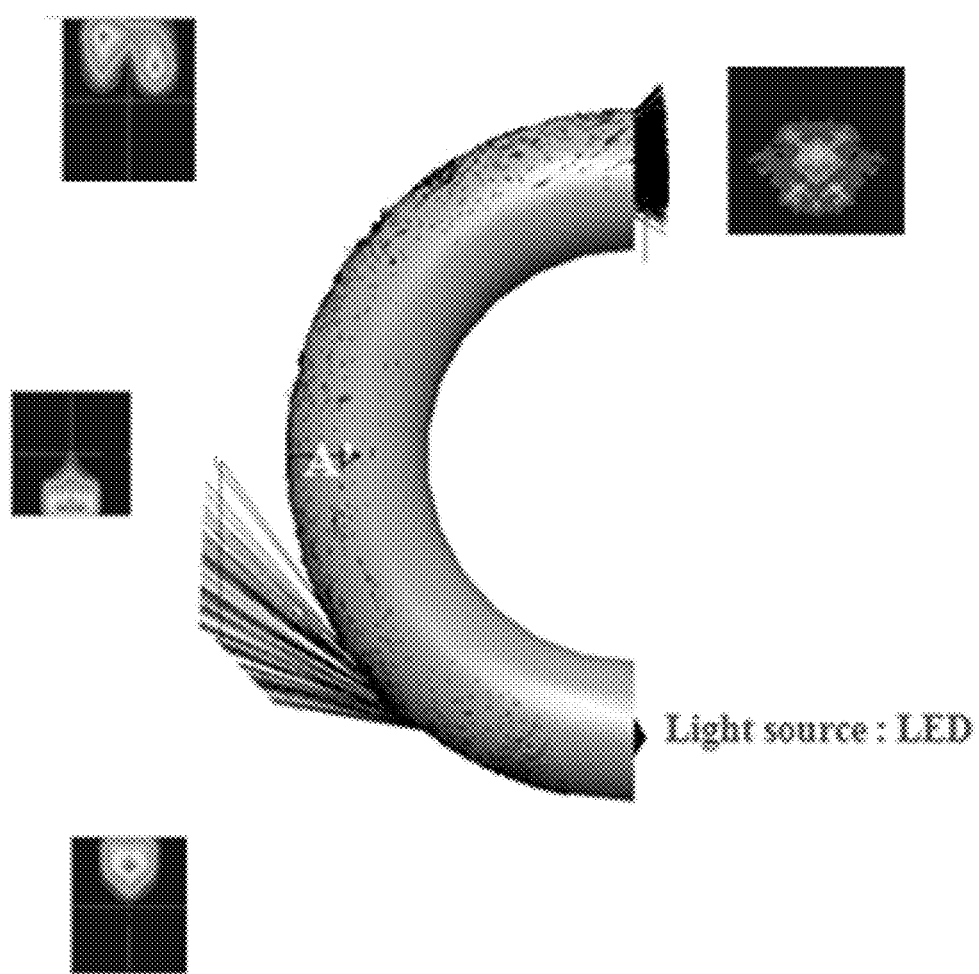

FIG. 12A and FIG. 12B show simulation results on light leakage for a light cylinder according to a first embodiment of the invention and a light cylinder manufactured by extrusion molding according to the related art.

FIG. 12A shows simulation results concerning light leakage in a light cylinder manufactured according to an embodiment of the invention, while FIG. 12B shows simulation results concerning light leakage in a light cylinder manufactured by extrusion molding.

As shown in FIG. 12B, it can be seen that the light cylinder manufactured by extrusion molding has much leakage of light in the curved region where the light source enters.

In contrast, it can be seen that the light cylinder 100 manufactured by filling a UV-curable resin as in an embodiment of the invention has almost no light leakage at the curved region where the light source enters.

Both the light pipe manufactured by extrusion molding and the light cylinder manufactured based on an embodiment of the invention have small amounts of light leakage at the bended part A, but the amounts are so small that they are not perceptible to the human eye.

Comparing the light at the output part opposite the surface where light enters, the light cylinder manufactured by extrusion molding has much of the light lost due to light leakage occurring at the curved region adjacent to the point where light enters, and as such, has a relatively smaller amount of light ejected at the output end of the light cylinder.

In contrast, the light cylinder manufactured by filling a UV-curable resin according to an embodiment of the invention has the light leakage almost eliminated at the region where the light cylinder manufactured by extrusion molding suffers much light leakage (the curved region adjacent to the light entrance point), with the light ejected evenly at the output end of the light cylinder.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

The invention claimed is:

1. A light cylinder comprising:
an outer layer pre-fabricated as a tube or a cylinder having an inside hollow space, wherein the outer layer has a thickness that is greater than or equal to 0.01 mm and less than or equal to 1 mm, and has a first refractive index; and
an inside layer being a layer of an optical resin made of optical substances without air bubbles,
wherein the outer layer is a sheath of the inside layer,
wherein the inside layer is formed by (i) preparing the outer layer for manufacturing the light cylinder, wherein the outer layer is temporarily held in a holder and moved in a row by a roller member for filling of the optical resin in the inside hollow space of the outer layer, (ii) determining a second refractive index of the inside layer to have a total reflection relationship with the outer layer based on a material of the outer layer, (iii) making the optical resin by combining a plurality of optical substances to obtain the determined second refractive index of the inside layer, (iv) filling the optical resin into the inside hollow space of the outer layer, and (v) UV curing the optical resin by irradiating UV rays in a direction coinciding with a direction in which the optical resin is filled,
wherein no void or oil gap is formed between the outer layer and the inside layer,
wherein the second refractive index of the inside layer is equal to the first refractive index of the outer layer+$\alpha$, and
wherein $\alpha$ represents a weighted value and satisfies the condition $0.001 \leq \alpha \leq 0.003$.

2. The light cylinder of claim 1, the inside layer is a core.

3. The light cylinder of claim 1, wherein the optical substances include a mixture of at least two of a urethane acrylate compound, an epoxy acrylate compound, an acrylate monomer, an acrylate comprising a vinyl group, a bisphenol compound, and an acrylate comprising a fluoro group.

4. A light cylinder comprising:
an outer layer pre-fabricated as a tube or a cylinder having an inside hollow space; and
an inside layer being a layer of optical resin made of optical substances without air bubbles,
wherein the inside layer is formed by filling the optical resin into the inside hollow space of the outer layer, and UV curing the optical resin by irradiating UV rays in a direction coinciding with a direction in which the optical resin is filled,
wherein the optical resin of the inside layer is formed by combining a plurality of optical substances to have a second refractive index, which is equal to a first refractive index of the outer layer+$\alpha$, and
wherein $\alpha$ represents a weighted value and satisfies the condition $0.001 \leq \alpha \leq 0.003$.

* * * * *